J. P. LONG.
Grain-Drill.
No. 46,480.  Patented Feb 21, 1865.
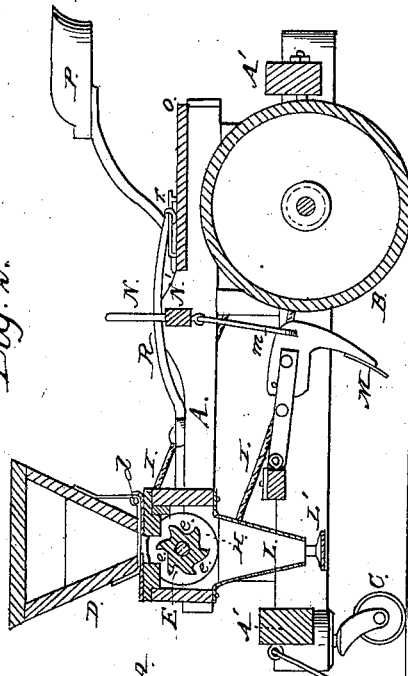
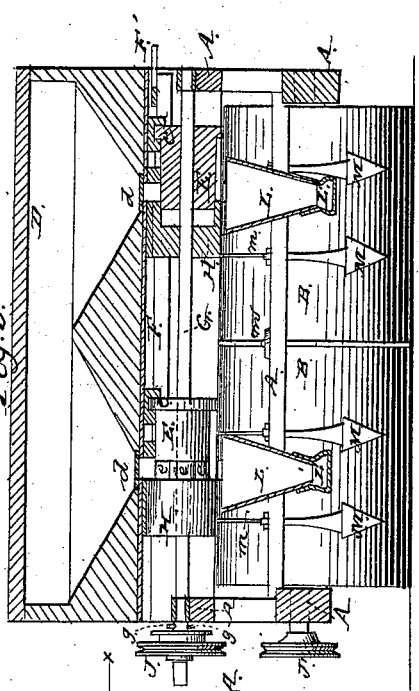
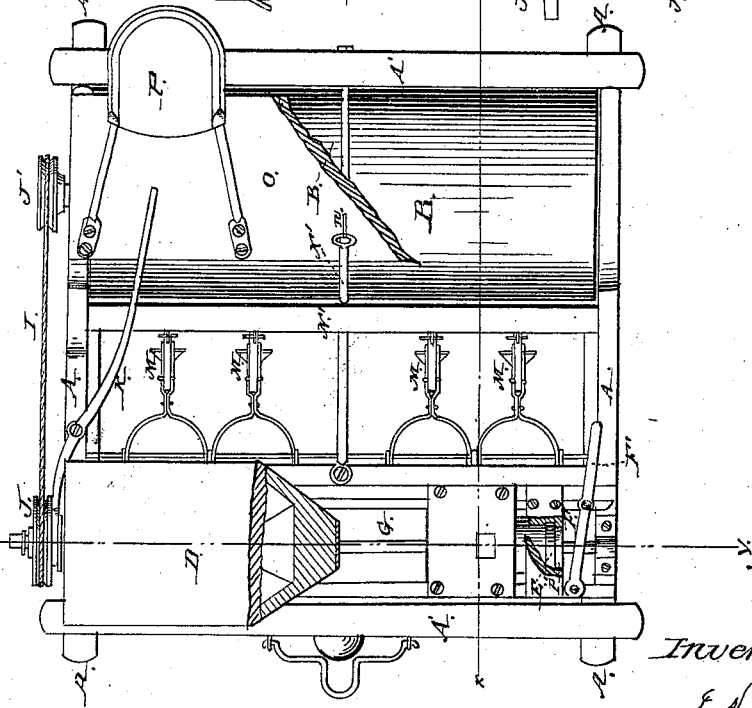
Witnesses:
C. D. Smith
Alex. A. C. Hauck
Inventor:
Jas. P. Long

UNITED STATES PATENT OFFICE.

JAMES P. LONG, OF OSAGE, IOWA.

IMPROVED COMBINED SEEDER, CULTIVATOR, AND ROLLER.

Specification forming part of Letters Patent No. 46,480, dated February 21, 1865.

*To all whom it may concern:*

Be it known that I, JAMES P. LONG, of Osage, in the county of Mitchell and State of Iowa, have invented a new and useful Broadcast-Seeder, Cultivator, and Roller Combined; and I do hereby declare the following to be a full and exact description of the same, reference being had to the accompanying drawings, making part of this specification, in which—

Figure 1 is a plan of my improved machine with a portion of the parts broken away to expose those located beneath. Fig. 2 is a vertical section from front to rear, the line $x\,x$, Fig. 1, indicating the plane of section. Fig. 3 is a vertical section in the line $y\,y$, Fig. 1, through the grain-hopper, and exhibiting in elevation the parts which operate in connection therewith.

Similar letters of reference indicate corresponding parts in the several figures.

The subject of my present invention is a single combined machine adapted to perform the successive operations of sowing seed broadcast, covering the same, and rolling during one passage over the ground. While the manner of constructing and combining the apparatus which performs these three operations is the chief feature of my invention, it is manifest that the principle upon which the machine is contrived would not be affected by the use of a grass-seeder—that is to say, I propose to provide the machine forming the subject of my claim with the necessary apparatus for sowing grass-seed, or to dispense with the use of such grass-seeding provision, as circumstances may render desirable.

In order that others skilled in the art to which my invention appertains may be enabled to fully understand and use the same, I will proceed to describe its construction and operation.

In the accompanying drawings, A A represent the several parts of the frame which carries the operating mechanism, and which is mounted upon rollers B B, located at the rear, and a caster or truck wheel, C, situated at the front.

D represents a grain-hopper mounted upon the forward end of the machine, and having in its bottom seed-apertures adapted to be closed by corresponding plates or cut-offs, $d$, when it is desired to arrest the flow of seed from the hopper to the cells or pockets $e$ of the seed-cylinders E E.

On one end of each of the seed-cylinders E is a flange, $e'$, entering a groove in the frame F, which is so arranged as to be moved longitudinally relatively to the hopper; and the frame F imparts its movements to the cylinders E, which, sliding upon the shaft G, adjust themselves within the boxes H in such manner as to vary the capacity of the cells $e$, the interior of the said boxes being scalloped or grooved in conformity with the cells. The boxes maintain an immovable position during the adjustment of the cylinders E. To facilitate the movement of the frame F, I use a hand-lever, F', having its fulcrum upon a fixed part of the frame.

A graduated plate or scale is to be employed in connection with the lever F to indicate the exact quantity of seed sown in a given area of ground.

The motion which rotates the shaft G and cylinders E is derived from one of the rollers B, and is transmitted by means of a band, I, working over pulleys J J'. By shifting the pulley J upon the shaft G it may be thrown into or out of connection with the pins or projections $g$, and in this way the rotation of the shaft G and of the seed-cylinders E may be produced or suspended at will. A lever, K, is employed to shift the pulley J.

L L represent conducting-tubes placed beneath the hopper so as to receive the grain as it falls from the seed-cells.

L' L' are disks connected to and occupying positions directly beneath the lower ends of the conducting-tubes L, and employed to cause the grain to scatter or fall broadcast upon the ground.

M M M M are shovels or covers situated at a point between the rollers B and hopper D, and arranged to work one on either side of each conducting-tube L. Their function is to loosen the soil and throw the same over the seed preparatory to its being compactly pressed down thereupon by the rollers B. They may be lowered to their working position or elevated above the ground to cease working by means of a hand-lever, N, inserted in the bar N', to which the covers M are connected by rods $m$. A loop, $n$, may serve to retain the lever N in its depressed position.

The driver's seat P is mounted upon the platform O within convenient proximity with the levers K N.

Two roller, B B, are made use of instead of one, in order to facilitate the turning of the machine.

When the machine is to be adapted for sowing grass-seed the main frame is to be extended in length.

The seeding, cultivating, or covering and rolling being performed at the same time, whenever the team stops the work is all completed to that point, and there is no loss from seed being uncovered by a sudden storm or other unexpected events. The seed is conveyed to the field upon the platform C, which covers or partially covers the rollers B. By the use of this machine the ground is left in the best possible condition for the growth of the grain, and for its being gathered in case of being lodged by storm. It reduces in a great degree the draft of the reaper.

I do not claim the distinct and separate devices of which this machine is composed, for these I am aware have been before used; but What I do claim as my improvement, and desire to secure by Letters Patent, is—

The combination of the seed-cylinder E, adjustable frame F, tubes L, and distributers L', cultivator-teeth M, and roller B, the several parts being arranged and operating as and for the purpose specified.

JAS. P. LONG.

Witnesses:
CHARLES D. SMITH,
ALEX. A. C. KLAUCKE.